(12) United States Patent
Harrington et al.

(10) Patent No.: US 10,589,871 B2
(45) Date of Patent: Mar. 17, 2020

(54) PROGNOSTIC HEALTH MONITORING AND JAM DETECTION FOR USE WITH AN AIRCRAFT

(71) Applicant: Hamilton Sundstrand Corporation, Charlotte, NC (US)

(72) Inventors: Erik Harrington, Machesney Park, IL (US); Christian Miller, Beloit, WI (US); Yuniya S. Bishop, Dixon, IL (US); Jason B. Kreienheder, Rockford, IL (US); Michael Skirtich, South Beloit, IL (US); Gregory T. Wallen, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 168 days.

(21) Appl. No.: 15/721,268

(22) Filed: Sep. 29, 2017

(65) Prior Publication Data
US 2019/0092491 A1 Mar. 28, 2019

Related U.S. Application Data

(63) Continuation of application No. 15/714,679, filed on Sep. 25, 2017.

(51) Int. Cl.
*B64D 45/00* (2006.01)
*G07C 5/08* (2006.01)
(Continued)

(52) U.S. Cl.
CPC .............. *B64D 45/00* (2013.01); *B64C 13/24* (2013.01); *B64C 13/28* (2013.01); *G07C 5/085* (2013.01);
(Continued)

(58) Field of Classification Search
CPC ...... B64D 2045/0085; B64D 2045/001; B64D 45/0005; B64C 9/30; B64C 9/00;
(Continued)

(56) References Cited

U.S. PATENT DOCUMENTS

| 4,779,822 A | 10/1988 | Burandt et al. |
| 5,199,538 A * | 4/1993 | Fischer ...................... B64C 9/16 192/223.3 |

(Continued)

OTHER PUBLICATIONS

Magtrol, TM 302-TM 308 In-Line Torque Transducers, Jul. 2005 (Year: 2005).*

(Continued)

*Primary Examiner* — Thomas G Black
*Assistant Examiner* — Sara J Lewandroski
(74) *Attorney, Agent, or Firm* — Cantor Colburn LLP (57) ABSTRACT

A method of prognostic health monitoring is provided for use with an aircraft. The method includes generating torque for controlling positions of controllable surfaces at right- and left-hand-sides (RHS and LHS) of the aircraft in a power drive unit (PDU) based on torque-limiter (TL) thresholds, performing real-time monitoring of the torque at the RHS and LHS of the aircraft, generating RHS and LHS torque information from results of the performing of the real-time monitoring, analyzing the RHS and LHS torque information and controlling operations of the PDU based on results of the analysis by at least one of modifying, tuning and defining the TL thresholds.

14 Claims, 8 Drawing Sheets

(51) Int. Cl.
*B64C 13/24* (2006.01)
*B64C 13/28* (2006.01)
*B64C 13/38* (2006.01)

(52) U.S. Cl.
CPC ............ *G07C 5/0808* (2013.01); *B64C 13/38* (2013.01); *B64D 2045/0085* (2013.01)

(58) Field of Classification Search
CPC ......... B64C 13/00; B64C 13/02; B64C 13/16; B64C 13/18; B64C 13/24; G07C 5/08; G07C 5/0808; G07C 5/0841; G07C 5/085; B60W 50/02; B60W 50/0205; B60W 50/0225; B60W 50/029; B60W 50/035; B60W 50/038; B60W 50/04; B60W 50/045; B60W 2050/021; B60W 2050/022; B60W 2050/0292; B60W 2050/0295; B60W 2050/0297
See application file for complete search history.

(56) References Cited

U.S. PATENT DOCUMENTS

| | | | |
|---|---|---|---|
| 5,593,109 A | 1/1997 | Williams | |
| 5,719,566 A | 2/1998 | Readman et al. | |
| 7,114,601 B2 | 10/2006 | Mayer et al. | |
| 8,033,509 B2* | 10/2011 | Yount | B64C 13/42 244/194 |
| 8,127,912 B2 | 3/2012 | Lang et al. | |
| 8,132,763 B2 | 3/2012 | Schievelbusch | |
| 8,868,261 B2 | 10/2014 | Recksiek et al. | |
| 8,996,205 B2 | 3/2015 | Pierre et al. | |
| 9,470,272 B2 | 10/2016 | Gitnes | |
| 9,483,057 B2 | 11/2016 | Dorr et al. | |
| 9,573,676 B2 | 2/2017 | Dyckrup et al. | |
| 2004/0200677 A1 | 10/2004 | Mayer et al. | |
| 2006/0060719 A1* | 3/2006 | Hauber | B64C 3/50 244/194 |
| 2007/0080261 A1* | 4/2007 | Neumann | B64D 45/0005 244/194 |
| 2009/0146015 A1* | 6/2009 | Schievelbusch | B64D 45/0005 244/213 |
| 2010/0286959 A1* | 11/2010 | Novis | F15B 15/2815 702/183 |
| 2010/0288886 A1* | 11/2010 | Schievelbusch | B64D 45/0005 244/194 |
| 2011/0057071 A1* | 3/2011 | Sahasrabudhe | G05D 1/0858 244/17.13 |
| 2011/0255968 A1* | 10/2011 | Recksiek | B64D 45/0005 416/23 |
| 2012/0312931 A1* | 12/2012 | Recksiek | B64C 9/16 244/203 |
| 2013/0009017 A1 | 1/2013 | Thompson et al. | |
| 2013/0181089 A1* | 7/2013 | Recksiek | B64C 9/16 244/99.3 |
| 2013/0313067 A1* | 11/2013 | Finney | F16H 35/10 192/223.2 |
| 2014/0288731 A1* | 9/2014 | Hagerott | B64C 9/04 701/3 |
| 2015/0274315 A1* | 10/2015 | Conrad | B64D 45/00 701/31.9 |
| 2015/0314852 A1 | 11/2015 | Needly et al. | |
| 2016/0096616 A1* | 4/2016 | Li | B64C 13/345 701/3 |
| 2018/0029690 A1* | 2/2018 | Hagerott | B64C 9/00 |
| 2018/0362147 A1* | 12/2018 | Huynh | B64C 13/50 |
| 2018/0362190 A1* | 12/2018 | Chambers | G07C 5/0866 |
| 2019/0055965 A1* | 2/2019 | Kracke | B64C 13/24 |
| 2019/0061531 A1* | 2/2019 | Harrington | B60L 7/18 |
| 2019/0063520 A1* | 2/2019 | Gianfranceschi | F16D 59/02 |

OTHER PUBLICATIONS

Search Report dated Jan. 7, 2019, EP Application No. 18196239.0, 8 pages.
Search Report dated Jan. 7, 2019, EP Application No. 18196876.9, 9 pages.

* cited by examiner

FIG. 6

PROGNOSTIC HEALTH MONITORING AND JAM DETECTION FOR USE WITH AN AIRCRAFT

BACKGROUND

The following description relates to prognostic health monitoring and jam detection for use with an aircraft and, more specifically, to prognostic health monitoring and jam detection for use with an aircraft with electronic torque transducers.

Current secondary flight control systems (SFCS) of an aircraft operate by transmitting torque from a power drive unit (PDU) to actuators that are distributed across leading edges of an aircraft wing via torque tubes and from a PDU to actuators that are distributed across trailing edges of the aircraft wing via torque tubes. Individual actuators contain a mechanical torque-limiter (TL) device that limits an amount of torque that can be transmitted along the torque tubes and can be tripped due to various causes such as internal or external jams that cause input torque to exceed a predefined threshold. Once the aircraft is on the ground, the mechanical TL devices are inspected one at a time within the corresponding aircraft wing until the individual actuator that tripped is discovered and reset.

No early warning is given, however, for cases in which actuator failure occurs or is likely to occur. The lack of such early warning can lead to aircraft-on-ground (AOG) issues and higher required spare actuator counts.

BRIEF DESCRIPTION

According to an aspect of the disclosure, a method of prognostic health monitoring is provided for use with an aircraft. The method includes generating torque for controlling positions of controllable surfaces at right- and left-hand-sides (RHS and LHS) of the aircraft in a power drive unit (PDU) based on torque-limiter (TL) thresholds, performing real-time monitoring of the torque at the RHS and LHS of the aircraft, generating RHS and LHS torque information from results of the performing of the real-time monitoring, analyzing the RHS and LHS torque information and controlling operations of the PDU based on results of the analysis by at least one of modifying, tuning and defining the TL thresholds.

In accordance with additional or alternative embodiments, the modifying of the TL thresholds is based on at least one of actuator life, actuator station, aircraft airspeed and aircraft temperature.

In accordance with additional or alternative embodiments, the tuning of the TL thresholds is based on aircraft performance targets.

In accordance with additional or alternative embodiments, the defining of the TL thresholds is based on at least one of input torque, a rate of change of input torque and a magnitude of opposite wing actuator input torque.

According to another aspect of the disclosure, a prognostic health monitoring system is provided for use with an aircraft. The aircraft includes a power drive unit (PDU) and actuators distributed along right- and left-hand-side (RHS and LHS) wings and driven by torque generated in the PDU to control positions of controllable surfaces. The prognostic health monitoring system includes RHS and LHS torque monitors disposed at each actuator distributed along the RHS and LHS wings, respectively and a processing unit which is communicative with each RHS and each LHS torque monitor. The processing unit is configured to perform, by way of communications with the RHS and LHS torque monitors, real-time monitoring of input torque for each actuator distributed along the RHS wing and the LHS wing, an analysis of information derived from the real-time monitoring and feedback control of operations of the PDU based on results of the analysis.

In accordance with additional or alternative embodiments, each RHS and LHS torque monitor includes a floating or fixed torque-transducer.

In accordance with additional or alternative embodiments, a database is accessible by the processing unit and has historic torque information stored thereon.

In accordance with additional or alternative embodiments, the processing unit is configured to continuously perform the real-time monitoring and the real-time monitoring includes at least one of trend monitoring and active prognostic health monitoring.

In accordance with additional or alternative embodiments, the feedback control of the operations of the PDU includes at least one of a modification, a tuning and a definition of torque-limiter (TL) thresholds.

In accordance with additional or alternative embodiments, the modification of the TL thresholds is based on at least one of actuator life, actuator station, aircraft airspeed and aircraft temperature.

In accordance with additional or alternative embodiments, the tuning of the TL thresholds is based on aircraft performance targets.

In accordance with additional or alternative embodiments, the definition of the TL thresholds is based on at least one of input torque, a rate of change of input torque and a magnitude of opposite wing actuator input torque.

According to yet another aspect of the disclosure, a prognostic health monitoring system is provided for use with an aircraft. The aircraft includes a power drive unit (PDU) and actuators distributed along right- and left-hand-side (RHS and LHS) wings and driven by torque generated in the PDU as RHS and LHS driveline torques to control positions of controllable surfaces. The prognostic health monitoring system includes RHS and LHS torque monitors respectively disposed at opposite operational sides of the PDU and a processing unit which is communicative with each RHS and LHS torque monitor. The processing unit is configured to perform, by way of communications with the RHS and LHS torque monitors, real-time monitoring of the RHS and LHS driveline torques, an analysis of information derived from the real-time monitoring and feedback control of operations of the PDU based on results of the analysis.

In accordance with additional or alternative embodiments, each RHS and LHS torque monitor includes a floating or fixed torque-transducer.

In accordance with additional or alternative embodiments, a database is accessible by the processing unit and has historic torque information stored thereon.

In accordance with additional or alternative embodiments, the processing unit is configured to continuously perform the real-time monitoring and the real-time monitoring includes at least one of trend monitoring and active prognostic health monitoring.

In accordance with additional or alternative embodiments, the feedback control of the operations of the PDU includes at least one of a modification, a tuning and a definition of torque-limiter (TL) thresholds.

In accordance with additional or alternative embodiments, the modification of the TL thresholds is based on at least one of actuator life, actuator station, aircraft airspeed and aircraft temperature.

In accordance with additional or alternative embodiments, the tuning of the TL thresholds is based on aircraft performance targets.

In accordance with additional or alternative embodiments, the definition of the TL thresholds is based on at least one of input torque, a rate of change of input torque and a magnitude of opposite wing actuator input torque.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, one or more electronic torque monitors is or are inserted or installed in an electronic control system of an aircraft to monitor driveline torque at the power drive unit (PDU) or to monitor input torques at each actuator along the driveline. Measured torque values can be used to modify, tune or define a torque-limiting (TL) threshold by which a power drive unit (PDU) is controllable.

Figure 1:
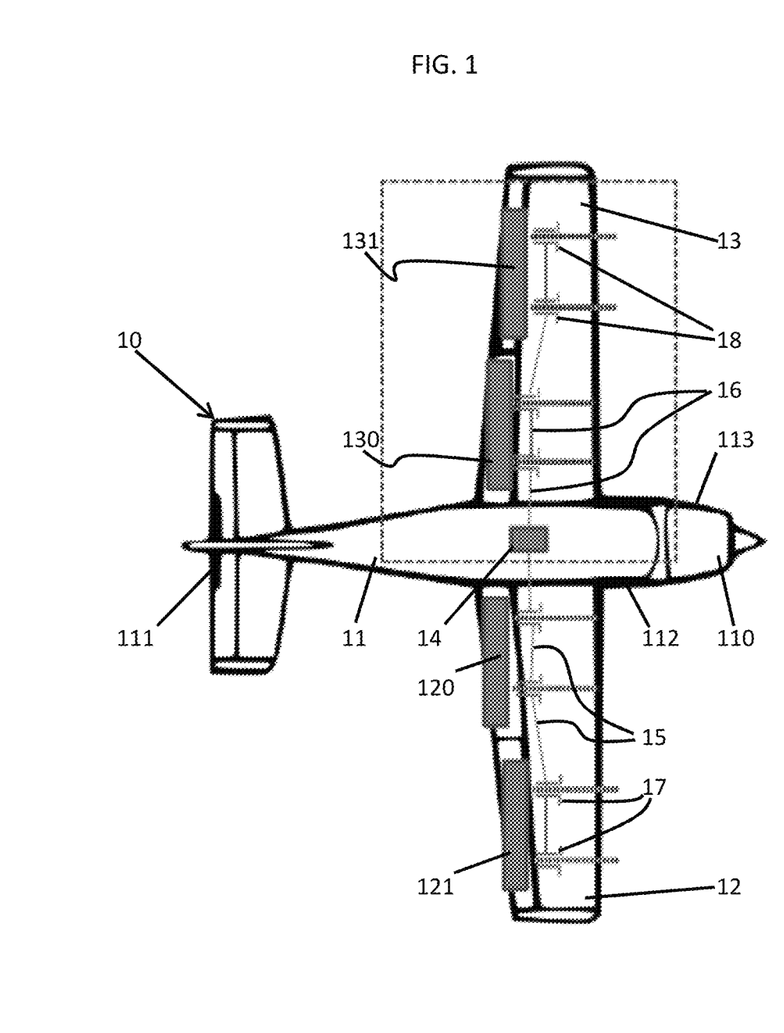
FIG. 1 is a top down cutaway view of an aircraft with controllable surfaces in stowed positions in accordance with embodiments.
Figure 2:
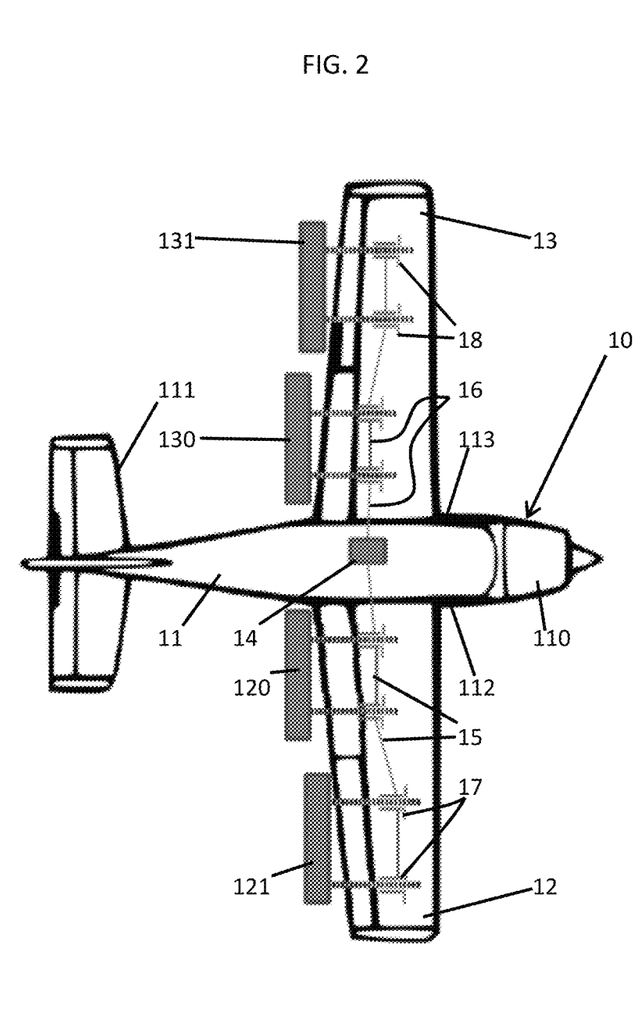
FIG. 2 is a top down cutaway view of an aircraft with controllable surfaces in deployed positions in accordance with embodiments.

With reference to FIGS. 1 and 2, an aircraft 10 is provided. As shown in FIGS. 1 and 2, the aircraft 10 includes a fuselage 11 having a forward section 110, a rear tail section 111 and right- and left-hand-sides (RHS and LHS) 112 and 113. An RHS wing 12 extends outwardly from the RHS 112 of the fuselage 11 and an LHS wing 13 extends outwardly from the LHS 113 of the fuselage 11. Inboard and outboard controllable surfaces 120 and 121 are provided on a trailing edge of the RHS wing 12 and inboard and outboard controllable surfaces 130 and 131 are provided on a trailing edge of the LHS wing 13.

The inboard and outboard controllable surfaces 120 and 121 of the RHS wing 12 and the inboard and outboard controllable surfaces 130 and 131 of the LHS wing 13 may be provided on either the trailing or the leading edges of the RHS and LHS wings 12 and 13 and may be provided as flaps, slats, ailerons, etc. In any case, respective positions of the inboard and outboard controllable surfaces 120 and 121 of the RHS wing 12 and the inboard and outboard controllable surfaces 130 and 131 of the LHS wing 13 are controllable in pivot and translation dimensions. For example, each of the inboard and outboard controllable surfaces 120 and 121 of the RHS wing 12 and the inboard and outboard controllable surfaces 130 and 131 of the LHS wing 13 may be translated from stowed positions as shown in FIG. 1 to deployed positions as shown in FIG. 2.

Figure 3:
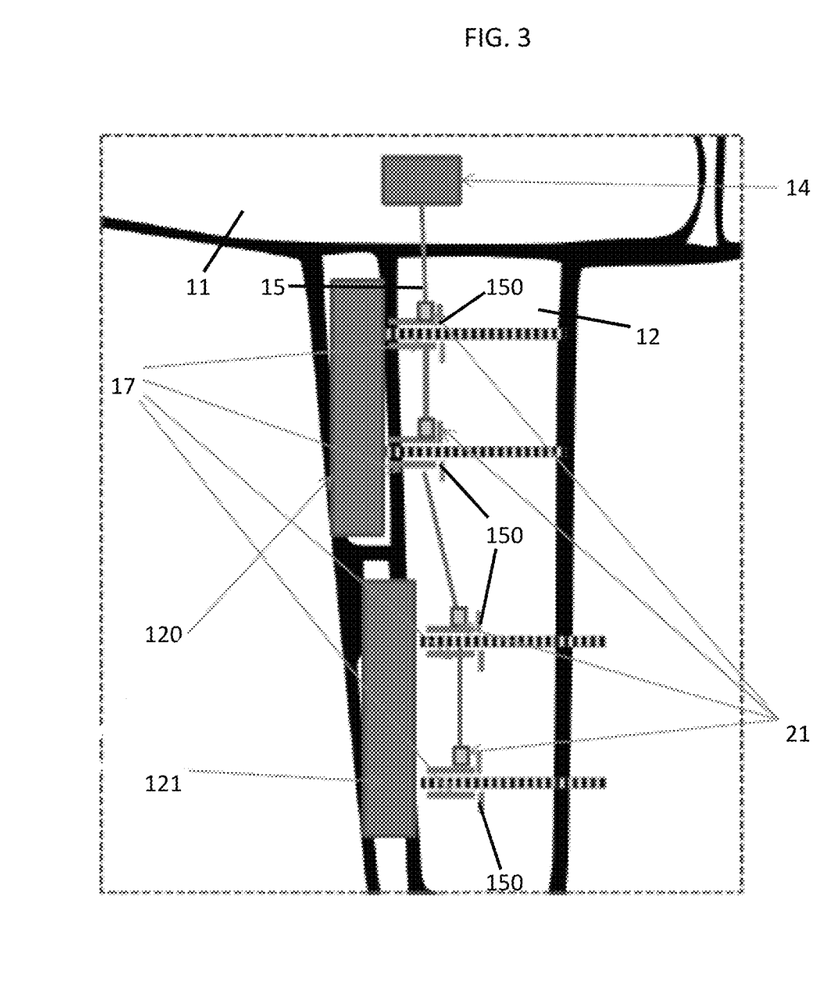
FIG. 3 is an enlarged top down cutaway view of a right-hand-side wing of the aircraft of FIG. 1 in accordance with embodiments.
Figure 4:
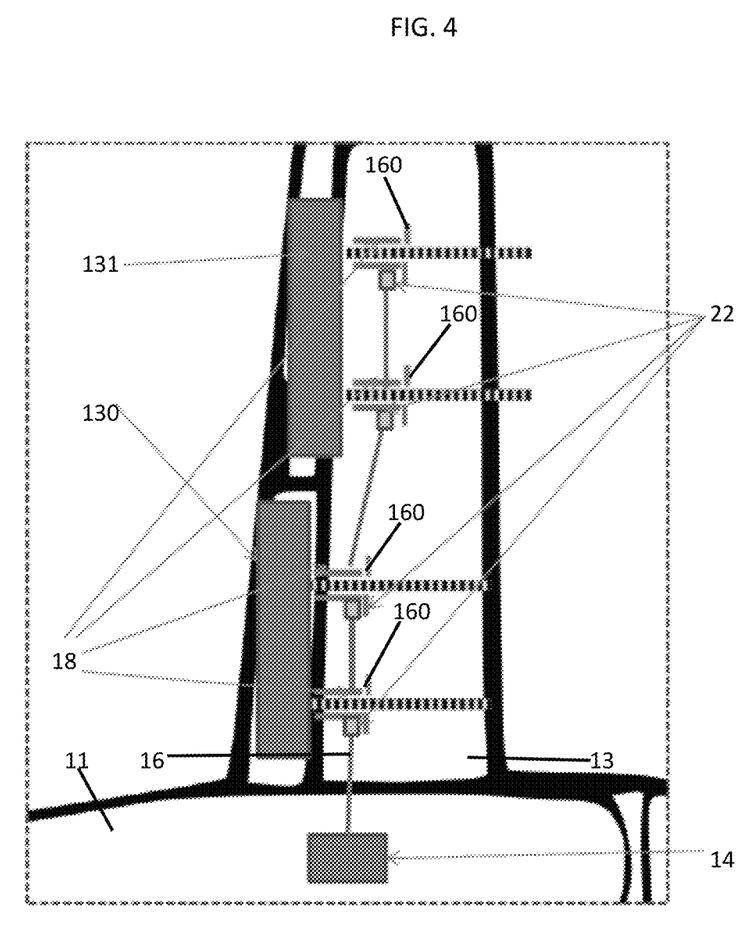
FIG. 4 is an enlarged top down cutaway view of a left-hand-side wing of the aircraft of FIG. 1 in accordance with embodiments.

With continued reference to FIGS. 1 and 2 and with additional reference to FIGS. 3 and 4, the aircraft 10 further includes a power drive unit (PDU) 14 which is housed or accommodated within the fuselage 11, a plurality of RHS torque tubes 15, a plurality of LHS torque tubes 16, a plurality of RHS actuators 17, which are distributed along the RHS wing 12, and a plurality of LHS actuators 18, which are distributed along the LHS wing 13. The RHS actuators 17 are driven by torque generated in the PDU 14 and transmitted to the RHS actuators 17 by the plurality of RHS torque tubes 15. The RHS actuators 17 are thus capable of using that torque to control positions of the inboard and outboard controllable surfaces 120 and 121 of the RHS wing 12. The LHS actuators 18 are similarly driven by torque generated in the PDU 14 and transmitted to the LHS actuators 18 by the plurality of LHS torque tubes 16. The LHS actuators 18 are thus capable of using that torque to control positions of the inboard and outboard controllable surfaces 130 and 131 of the LHS wing 13.

The aircraft 10 may further include respective pluralities of RHS and LHS torque-limiters 150 and 160 that are distributed along the RHS wing 12 and the LHS wing 13 along with the respective pluralities of the RHS and LHS actuators 17 and 18. Each of the respective pluralities of the RHS and LHS torque-limiters 150 and 160 may include, for example, a ball-ramp mechanism interposed between an input shaft and an output shaft. Here, rotation of the input shaft is normally transmitted through the ball-ramp mechanism to the output shaft unless the torque-applied to the input shaft exceeds the TL threshold and causes the ball-ramp mechanism to trip. That is, each of the respective pluralities of the RHS and LHS torque-limiters 150 and 160 can be tripped by input torque being provided to the corresponding one of the respective pluralities of RHS and LHS actuators 17 and 18 but exceeding a predefined torque-limiter (TL) threshold. Such increases in input torque beyond the TL threshold can occur due to internal or external jams of the inboard and outboard controllable surfaces 120, 121, 130 and 131 or of the respective pluralities of the RHS and LHS actuators 17 and 18 resulting from component wear or fatigue or foreign object damage.

Figure 5:
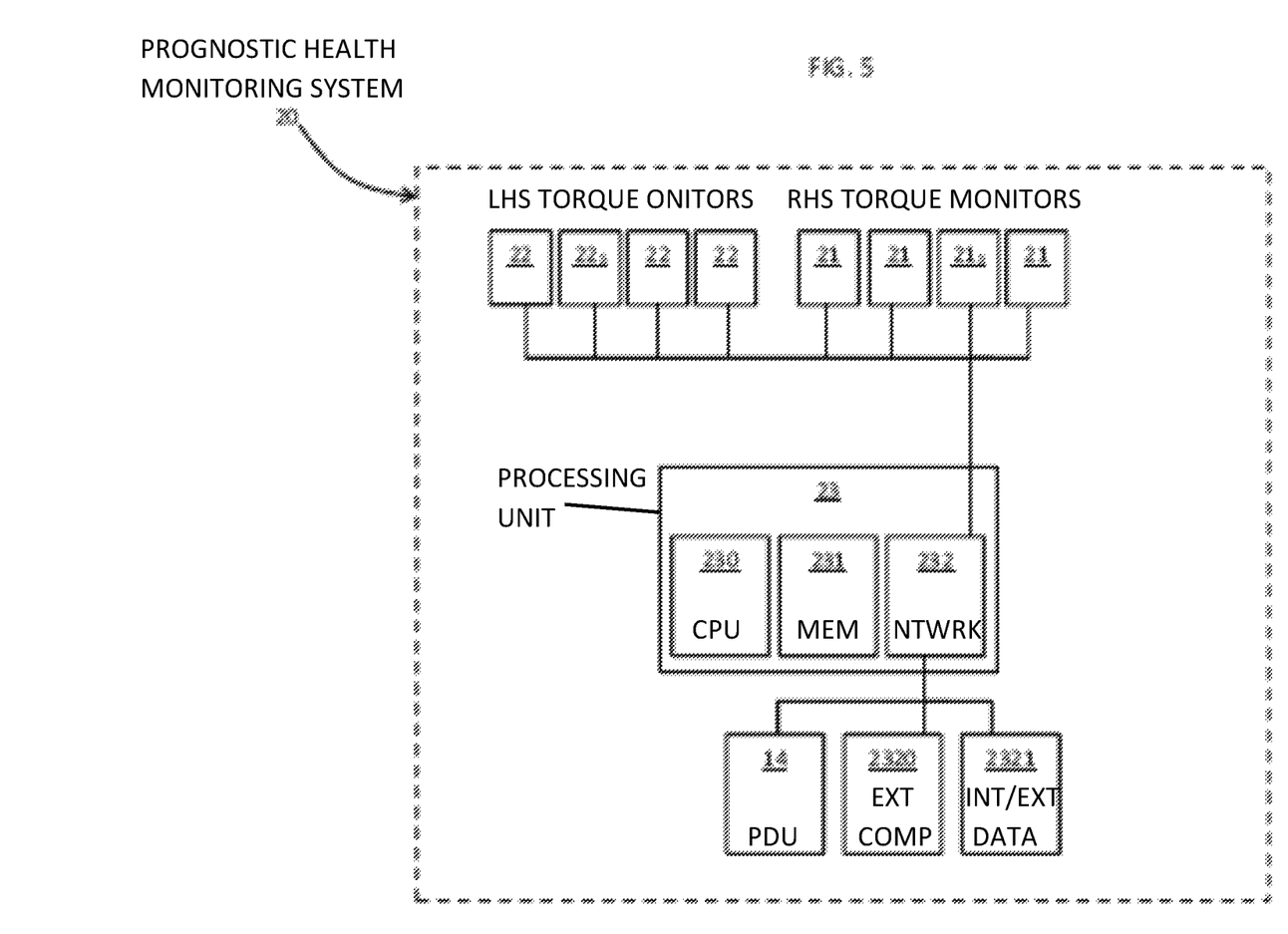
FIG. 5 is a schematic diagram illustrating a processing unit of an aircraft in accordance with embodiments.

With continued reference to FIGS. 3 and 4 and with additional reference to FIG. 5, the aircraft 10 may include a prognostic health monitoring system 20. The prognostic health monitoring system 20 includes a plurality of RHS torque monitors 21, a plurality of LHS torque monitors 22 and a processing unit 23. The plurality of RHS torque monitors 21 is arranged such that each individual RHS torque monitor 21 is respectively disposed at a corresponding RHS actuator 17 or RHS torque-limiter 150 (see FIG. 3) with each individual RHS torque monitor 21 being respectively configured to measure input torque to the corresponding RHS actuator 17. The plurality of LHS torque monitors 22 is arranged such that each individual LHS torque monitor 22 is respectively disposed at a corresponding LHS actuator 18 or LHS torque-limiter 160 (see FIG. 4) with each individual LHS torque monitor 22 being respectively configured to measure input torque to the corresponding LHS actuator 18.

In accordance with embodiments, each of the plurality of RHS torque monitors 21 may include at least one of a floating torque-transducer and a fixed torque-transducer and each of the plurality of LHS torque monitors 22 may include at least one of a floating torque-transducer and a fixed torque-transducer.

The processing unit 23 may be accommodated within the PDU 14, another component such as a flight control computer (FCC) or as a standalone component. In any case, as shown in FIG. 5, the processing unit 23 may include a central processor (or CPU) 230, a memory unit (or MEM) 231 and a networking unit (or NTWRK) 232 by which the central processor 230 is communicative with external computing devices (or EXT COMP) 2320 and internal or external databases (or INT/EXT DATA) 2321 and with each of the plurality of RHS torque monitors 21 and each of the plurality of LHS torque monitors 22. The memory unit 231 has executable instructions stored thereon, which, when executed, cause the central processor 230 to at least continuously perform, by way of communications between the central processor 230, the external computing devices 2320, the internal or external databases 2321 and each of the respective pluralities of RHS and LHS torque monitors 21 and 22 via the networking unit 232, real-time trend and/or active prognostic health monitoring of input torque for each of the plurality of RHS actuators 17 and for each of the plurality of LHS actuators 18 that may or may not exceed the TL threshold.

In addition, when executed, the executable instructions may cause the central processor 230 to analyze information derived from the performance of the real-time monitoring and to control operations of the PDU 14 based on analysis results. This continuous performance of real-time trend and/or active prognostic health monitoring of input torque can be used to identify issues with the inboard and outboard controllable surfaces 120, 121, 130 and 131 or the respective pluralities of the RHS and LHS actuators 17 and 18 before those issues lead to the above-noted internal or external jams or the tripping of any of the RHS and LHS torque-limiters.

In an exemplary case, the continuous performance of the real-time trend and/or active prognostic health monitoring may include or involve a comparison between the input torque for each of the plurality of RHS actuators 17 and the input torque for each of the plurality of the LHS actuators 18 at least with each other or with corresponding historic torque information which may be stored on the internal or external databases 2321. In an event that such comparison indicates that the respective input torques of one of the plurality of RHS actuators 17 differs from a corresponding one of the LHS actuators 18 or from the corresponding historic torque information for similar conditions, the central processor 230 may adjust operations of the PDU 14 or shut off the faulty actuator or the PDU 14.

That is, if the third-most outboard RHS torque monitor $21_3$ measures an input torque that is higher than the input torque measured by the corresponding LHS torque monitor $22_3$ or which is outside of an input torque range by an amount or degree that exceeds a predefined threshold (which is variable for different components at different points in their respective lifetimes and updateable in view of the corresponding historic torque information) for a given period of time, the central processor 230 may determine that the corresponding actuator or controllable surface is likely exhibiting wear that may lead to failure or some other similar result and may take action (e.g., by adjusting the operations of or shutting off the PDU 14 or by shutting off the corresponding actuator) so as to avoid that failure or result.

In another exemplary case, the continuous performance of the real-time trend and/or active prognostic health monitoring may include or involve a summation of input torques for each RHS actuator 17 to determine or calculate a first total input torque, a summation of input torques for each LHS actuator 18 to determine or calculate a second total input torque and a comparison of the first and second total input torques at least with each other or with corresponding historic torque information which may be stored on the internal or external databases 2321. In an event that such comparison indicates that the first and second total input torques differ from one another or from the corresponding historic torque information for similar conditions, the central processor 230 may adjust operations of the PDU 14 or shut off the faulty actuator or the PDU 14.

That is, if the first and second total input torques differ from one another or one of them is outside of a total input torque range by an amount or degree that exceeds a predefined threshold (which is variable for different components at different points in their respective lifetimes and updateable in view of the corresponding historic torque information) for a given period of time, the central processor 230 may determine that some or all of the corresponding actuators or controllable surfaces is or are likely exhibiting wear that may lead to failure or some other similar result and may take action (e.g., by adjusting the operations of or shutting off the PDU 14 or by shutting off the corresponding actuators) so as to avoid that failure or result.

As used herein, the phrase "opposite operational sides" does not necessarily refer to the RHS and LHS torque monitors 51 and 52 being disposed at right and left sides of the PDU 14. While this may be the case, the RHS and LHS torque monitors 51 and 52 may be physically disposed anywhere on the aircraft 10 as long as they are capable of measuring the RHS and LHS driveline torques. For purposes of clarity and brevity, however, the following description and the accompanying illustrations in FIGS. 6 and 7 will relate to the exemplary case in which the RHS and LHS torque monitors 51 and 52 are actually arranged at opposite operational and physical sides of the PDU 14.

Figure 6:
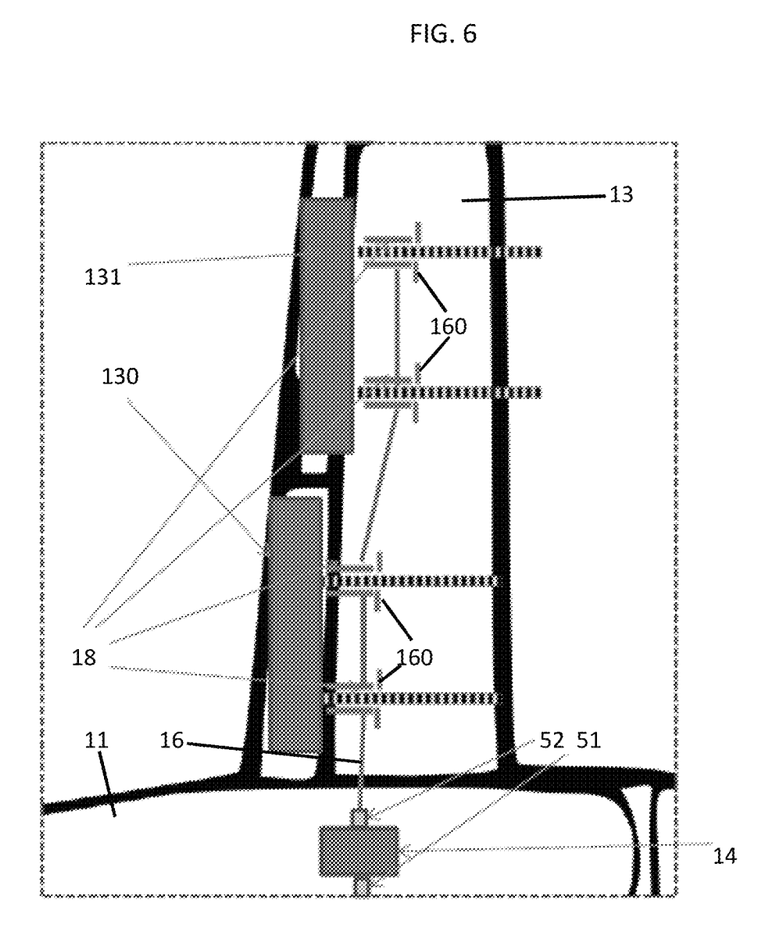
FIG. 6 is an enlarged top down cutaway view of a left-hand-side wing of the aircraft of FIG. 1 in accordance with embodiments.
Figure 7:
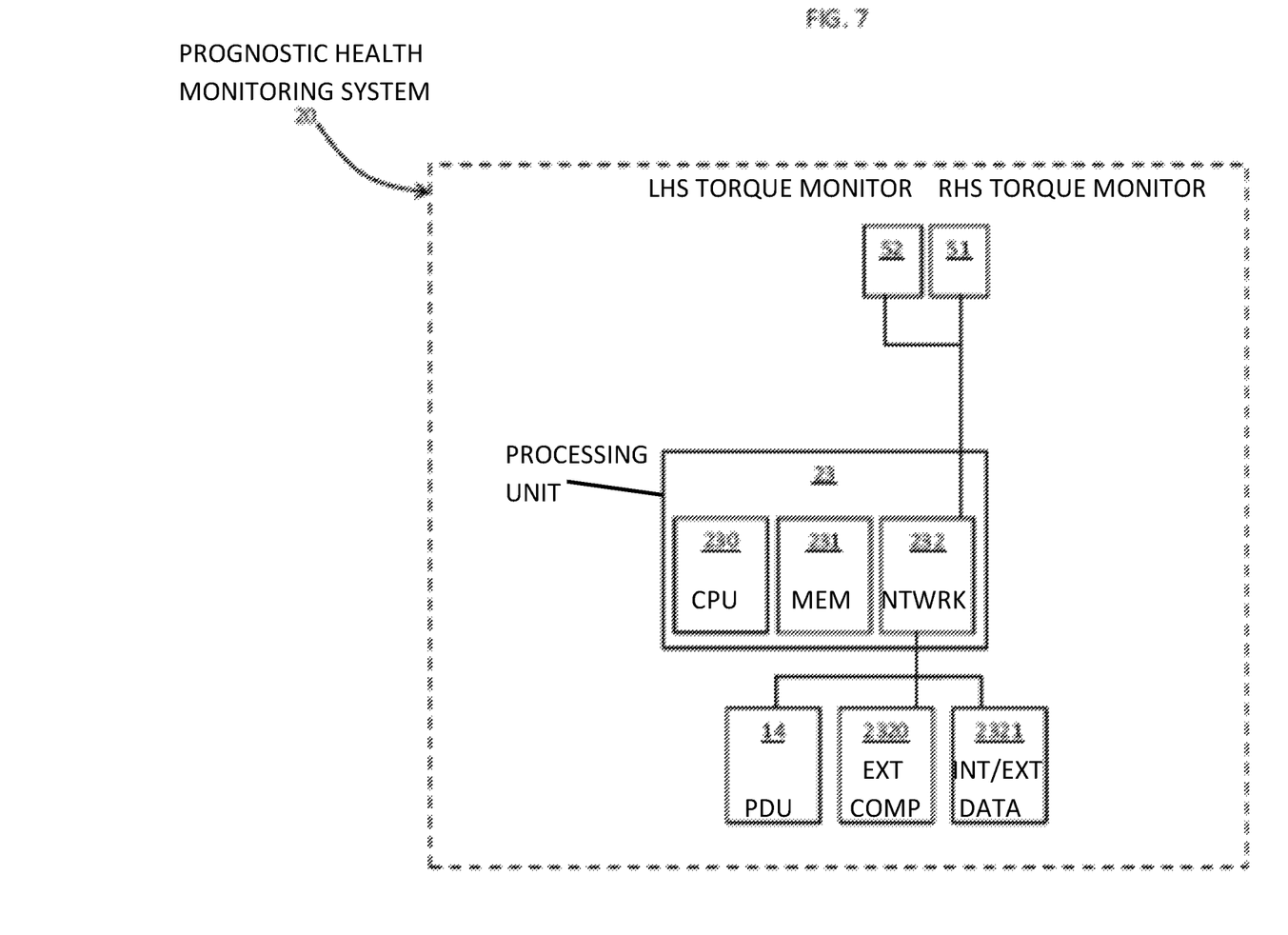
FIG. 7 is a schematic diagram illustrating a processing unit of an aircraft in accordance with embodiments.

With reference to FIGS. 6 and 7, the prognostic health monitoring system 20 of the aircraft 10 may include RHS and LHS torque monitors 51 and 52, which may be provided as floating or fixed torque-transducers, and the processing unit 23 (see FIG. 4) as generally described above. The RHS and LHS torque monitors 51 and 52 are respectively arranged at opposite operational sides of the PDU 14 with the RHS torque monitor 51 being configured to monitor RHS driveline torque being transmitted toward the RHS wing 12 and with the LHS torque monitor 52 being configured to monitor LHS driveline torque being transmitted toward the LHS wing 13.

Here, the memory unit 231 has executable instructions stored thereon, which, when executed, cause the central processor 230 to at least continuously perform, by way of communications between the central processor 230, the external computing devices 2320, the internal or external databases 2321 and each of the RHS and LHS torque monitors 51 and 52 via the networking unit 232, real-time trend and/or active prognostic health monitoring of the RHS and LHS driveline torques.

In addition, when executed, the executable instructions may cause the central processor 230 to analyze information derived from the performance of the real-time monitoring and to control operations of the PDU 14 based on analysis results. This continuous performance of real-time trend and/or active prognostic health monitoring of input torque can be used to identify issues with the inboard and outboard controllable surfaces 120, 121, 130 and 131 or the respective pluralities of the RHS and LHS actuators 17 and 18 before those issues lead to the above-noted internal or external jams or the tripping of any of the RHS and LHS torque-limiters.

In an exemplary case, the continuous performance of the real-time trend and/or active prognostic health monitoring may include or involve a comparison of the RHS and LHS driveline torques at least with each other or with corresponding historic torque information which may be stored on the internal or external databases 2321. In an event that such comparison indicates that the RHS and LHS driveline torques differ from one another or from the corresponding historic torque information for similar conditions, the central processor 230 may adjust operations of the PDU 14 or shut off faulty actuators or the PDU 14.

That is, if the RHS and LHS driveline torques differ from one another or one of them is outside of a driveline torque range by an amount or degree that exceeds a predefined threshold (which is variable for different components at different points in their respective lifetimes and updateable in view of the corresponding historic torque information) for a given period of time but may or may not exceed a corresponding TL threshold, the central processor 230 may determine that some or all of the corresponding actuators or controllable surfaces is or are likely exhibiting wear that may lead to failure or some other similar result and may take action (e.g., by adjusting the operations of or shutting off the PDU 14 or by shutting off the corresponding actuators) so as to avoid that failure or result.

Figure 8:
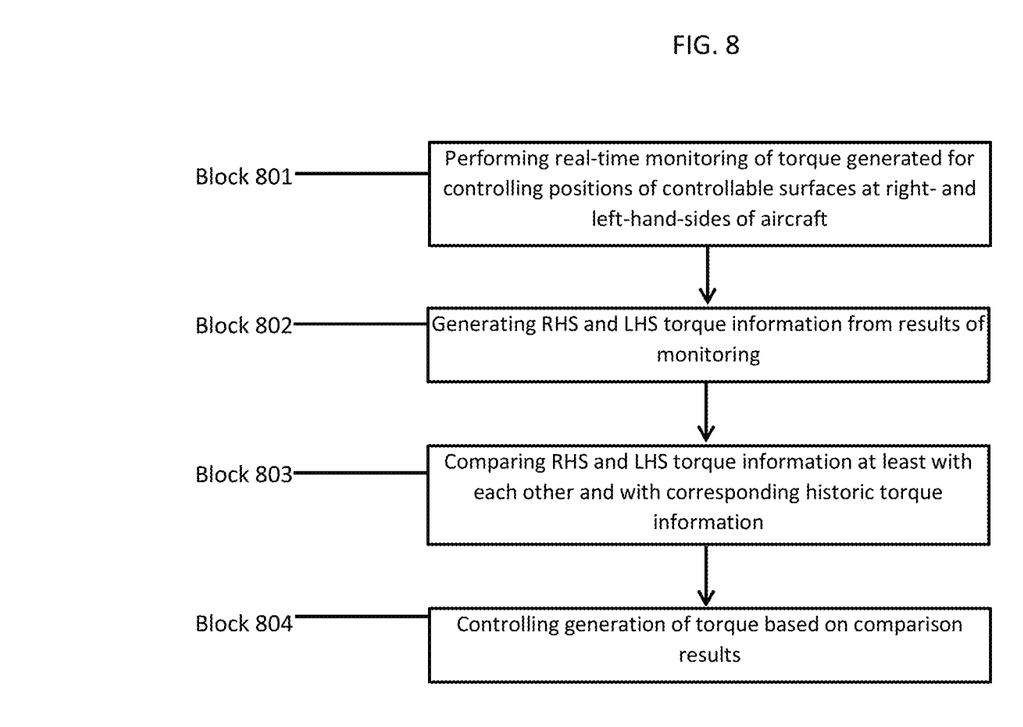
FIG. 8 is a flow diagram illustrating a method of prognostic health monitoring in accordance with embodiments.

With reference to FIG. 8, a method of prognostic health monitoring for use with an aircraft is provided and is applicable for the cases described above with reference to FIGS. 3, 4 and 5 and with reference to FIGS. 6 and 7. As shown in FIG. 8, the method includes performing real-time monitoring of torque generated for controlling positions of controllable surfaces at right- and left-hand-sides (RHS and LHS) of the aircraft (block 801), generating RHS and LHS torque information from results of the monitoring (block 802), comparing the RHS and LHS torque information at least with each other or with corresponding historic torque information (block 803) and, in some cases, controlling a generation of the torque based on comparison results (block 804).

Figure 9:
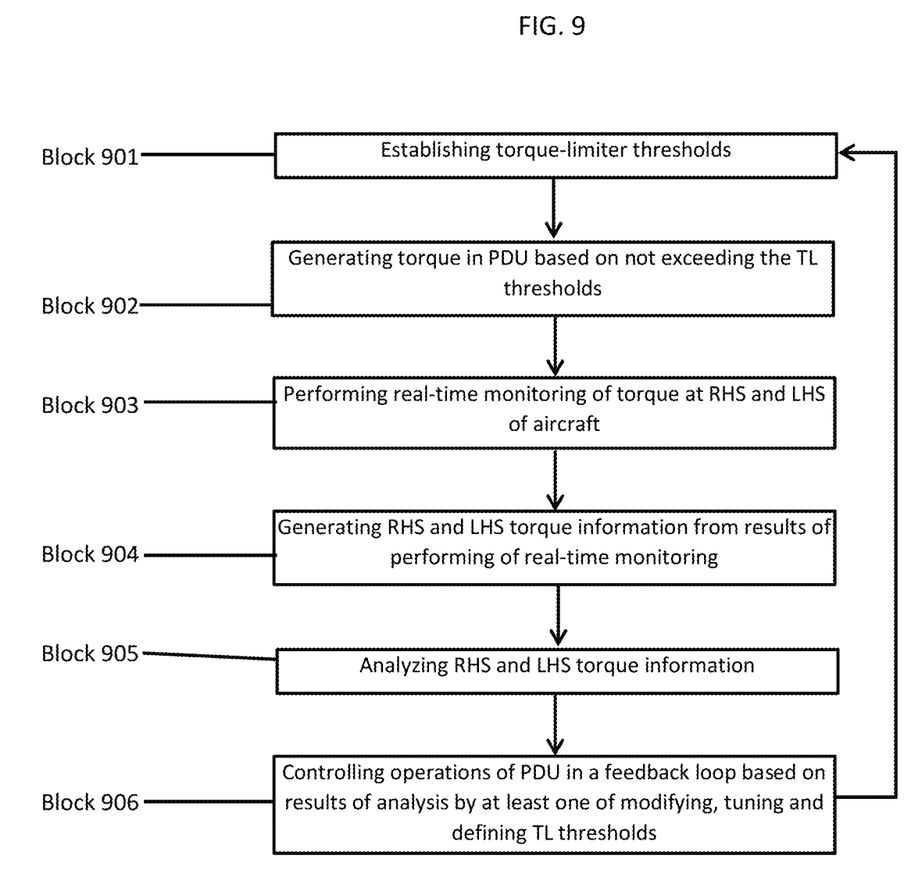
FIG. 9 is a flow diagram illustrating a method of prognostic health monitoring in accordance with embodiments.

With reference to FIG. 9, a method of prognostic health monitoring for use with an aircraft is provided and is applicable for the cases described above with reference to FIGS. 3, 4 and 5 and with reference to FIGS. 6 and 7. As shown in FIG. 9, the method initially includes establishing torque-limiter (TL) thresholds that would be designed and defined for limiting an amount of torque that could be generated by a power drive unit (PDU) for controlling positions of controllable surfaces at right- and left-hand-sides (RHS and LHS) of the aircraft and transmitted via torque-limiters to corresponding RHS and LHS actuators (block 901). The TL thresholds may be set to be lower than the actual torque thresholds at which the torque-limiters will trip or at some level which is substantially lower so as to present little to no risk of TL tripping events. The method further includes generating the torque in the PDU based on not exceeding the TL thresholds (block 902), performing real-time monitoring of the torque at the RHS and LHS of the aircraft (block 903) and generating RHS and LHS torque information from results of the performing of the real-time monitoring (block 904). In addition, the method may include analyzing the RHS and LHS torque information (block 905) and controlling operations of the PDU in a feedback loop based on results of the analysis by at least one of modifying, tuning and defining the TL thresholds (block 906).

The performing of the real-time monitoring and the generating of the RHS and LHS torque information may be accomplished by way of the torque monitors described above. Similarly, the analyzing and the controlling may be accomplished by way of the processing unit described above.

In accordance with embodiments, the modifying, tuning, and defining of the TL thresholds of block 906 may be based on at least one of actuator life, actuator station (i.e., same hardware could be monitored to different input torques depending on anticipated wing loads), aircraft airspeed and aircraft temperature, the tuning of the TL thresholds may be based on aircraft performance targets and the defining of the TL thresholds may be based on at least one of input torque, a rate of change of input torque and a magnitude of opposite wing actuator input torque.

Thus, in an event that the analyzing of the torque information suggests that the input torque being provided to the RHS actuators of the aircraft is increasing due to unexpected wear of the RHS actuators, the processing unit may lower the TL threshold for the PDU at least for the RHS of the aircraft. As such, the PDU will be prevented from generating torque that would otherwise be permitted by the corresponding TLs.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A prognostic health monitoring system for use with an aircraft comprising a power drive unit (PDU) and actuators distributed along right- and left-hand-side (RHS and LHS) wings and driven by torque generated in the PDU as RHS and LHS driveline torques to control positions of controllable surfaces via RHS and LHS torque-limiters at each individual one of the actuators distributed along the RHS and LHS wings, respectively, the prognostic health monitoring system comprising:

RHS and LHS torque monitors respectively disposed at opposite operational sides of the PDU; and     a processing unit which is communicative with each RHS and LHS torque monitor and configured to perform by way of communications with the RHS and LHS torque monitors:

real-time monitoring of the RHS and LHS driveline torques, an analysis of information derived from the real-time monitoring, and feedback control of operations of the PDU based on results of the analysis comprising at least one of a modification, a tuning and a definition of torque-limiter (TL) thresholds of each of the RHS and LHS torque-limiters at each individual one of the actuators distributed along the RHS and LHS wings, respectively.

2. The prognostic health monitoring system according to claim 1, wherein each RHS and LHS torque monitor comprises a floating or fixed torque-transducer.

3. The prognostic health monitoring system according to claim 1, further comprising a database which is accessible by the processing unit and on which historic torque information is stored.

4. The prognostic health monitoring system according to claim 1, wherein:
the processing unit is configured to continuously perform the real-time monitoring, and
the real-time monitoring comprises at least one of trend monitoring and active prognostic health monitoring.

5. The prognostic health monitoring system according to claim 1, wherein the modification of the TL thresholds is based on at least one of actuator life, actuator station, aircraft airspeed and aircraft temperature.

6. The prognostic health monitoring system according to claim 1, wherein the tuning of the TL thresholds is based on aircraft performance targets.

7. The prognostic health monitoring system according to claim 1, wherein the definition of the TL thresholds is based on at least one of input torque, a rate of change of input torque and a magnitude of opposite wing actuator input torque.

8. A prognostic health monitoring system for use with an aircraft comprising a power drive unit (PDU) and actuators distributed along right- and left-hand-side (RHS and LHS) wings and driven by torque generated in the PDU to control positions of controllable surfaces via RHS and LHS torque-limiters at each individual one of the actuators distributed along the RHS and LHS wings, respectively, the prognostic health monitoring system comprising:
RHS and LHS torque monitors disposed at each individual one of the actuators distributed along the RHS and LHS wings, respectively; and a processing unit which is communicative with each RHS and each LHS torque monitor and configured to perform by way of communications with the RHS and LHS torque monitors:

real-time monitoring of input torque for each individual one of the actuators distributed along the RHS wing and the LHS wing, an analysis of information derived from the real-time monitoring, and feedback control of operations of the PDU based on results of the analysis comprising at least one of a modification, a tuning and a definition of torque-limiter (TL) thresholds of each of the RHS and LHS torque-limiters at each individual one of the actuators distributed along the RHS and LHS wings, respectively.

9. The prognostic health monitoring system according to claim 8, wherein each RHS and LHS torque monitor comprises a floating or fixed torque-transducer.

10. The prognostic health monitoring system according to claim 8, wherein the modification of the TL thresholds is based on at least one of actuator life, actuator station, aircraft airspeed and aircraft temperature.

11. The prognostic health monitoring system according to claim 8, wherein the tuning of the TL thresholds is based on aircraft performance targets.

12. The prognostic health monitoring system according to claim 8, wherein the definition of the TL thresholds is based on at least one of input torque, a rate of change of input torque and a magnitude of opposite wing actuator input torque.

13. The prognostic health monitoring system according to claim 8, further comprising a database which is accessible by the processing unit and on which historic torque information is stored.

14. The prognostic health monitoring system according to claim 8, wherein:
the processing unit is configured to continuously perform the real-time monitoring, and
the real-time monitoring comprises at least one of trend monitoring and active prognostic health monitoring.

* * * * *